United States Patent [19]
Pereyra et al.

[11] Patent Number: 5,964,181
[45] Date of Patent: *Oct. 12, 1999

[54] TEMPERATURE INDICATING DEVICE

[75] Inventors: Rodger J. Pereyra, Cottage Grove; Russell D. Birkholz, Maplewood; Matthew T. Scholz, Woodbury, all of Minn.

[73] Assignee: 3M Innovative Properties Company, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/558,892

[22] Filed: Nov. 16, 1995

[51] Int. Cl.⁶ .................................................. G01K 11/12
[52] U.S. Cl. ...................... 116/216; 116/206; 252/408.1; 252/962; 374/162
[58] Field of Search .................................... 116/206, 216, 116/217, 219, 207; 374/159, 162; 426/88; 252/408.1, 962

[56] References Cited

U.S. PATENT DOCUMENTS

| | | |
|---|---|---|
| 2,460,215 | 1/1949 | Chase . |
| 2,903,188 | 9/1959 | Hutchinson . |
| 2,971,852 | 2/1961 | Schulein . |
| 3,055,759 | 9/1962 | Busby et al. . |
| 3,177,843 | 4/1965 | Geocaris . |
| 3,414,415 | 12/1968 | Broad, Jr. . |
| 3,545,400 | 12/1970 | Smith . |
| 3,702,077 | 11/1972 | Szabo . |
| 3,826,141 | 7/1974 | Pickett et al. . |
| 3,922,917 | 12/1975 | Ayres . |
| 3,946,612 | 3/1976 | Sagi et al. . |
| 3,958,528 | 5/1976 | Hill . |
| 3,967,579 | 7/1976 | Seiter . |
| 3,980,581 | 9/1976 | Godsey, Jr. et al. . |
| 4,022,149 | 5/1977 | Berger . |
| 4,028,944 | 6/1977 | Erb . |

(List continued on next page.)

FOREIGN PATENT DOCUMENTS

| | | |
|---|---|---|
| 310428 | 4/1989 | European Pat. Off. . |
| 625700 | 11/1994 | European Pat. Off. . |
| 2625556 | 7/1989 | France . |
| 27 36 470 | 2/1978 | Germany . |
| 59-17121 | 1/1984 | Japan . |
| 59-175172 | 8/1984 | Japan . |
| 2119511 | 11/1983 | United Kingdom . |
| 2130720 | 6/1984 | United Kingdom . |

OTHER PUBLICATIONS

"3M Scotchpak™ Strippable Lid Films" Brochure of 3M Company, 2 pgs (Apr. 1991).

"ACLAR®" Brochure of Allied Signal Plastics, 18 pgs (undated).

Primary Examiner—Andrew Hirshfeld
Attorney, Agent, or Firm—James J. Trussell

[57] ABSTRACT

A critical temperature indicating device is provided. It includes a microporous membrane, an indicating composition containing less than about 10 wt-% water, and means for containing the microporous membrane and the indicating composition. The indicating composition includes: a primary organic component comprising at least one compound that has a freezing point above the critical temperature and does not spontaneously wet out the microporous membrane at a temperature at least about 30° C. above the critical temperature; a modifying component comprising at least one compound that has a freezing point below the critical temperature; and a wetting component comprising at least one compound that has a freezing point below the critical temperature and is capable of spontaneously wetting out the microporous membrane at about the critical temperature.

30 Claims, 1 Drawing Sheet

U.S. PATENT DOCUMENTS

| | | |
|---|---|---|
| 4,120,818 | 10/1978 | Swindells et al. . |
| 4,145,918 | 3/1979 | Couch et al. . |
| 4,149,852 | 4/1979 | Tiru et al. . |
| 4,163,427 | 8/1979 | Cooperman et al. . |
| 4,279,152 | 7/1981 | Crossland ................................ 116/216 |
| 4,428,321 | 1/1984 | Arens . |
| 4,432,656 | 2/1984 | Allmendinger . |
| 4,457,252 | 7/1984 | Manske . |
| 4,457,253 | 7/1984 | Manske . |
| 4,469,452 | 9/1984 | Sharpless et al. . |
| 4,539,256 | 9/1985 | Shipman . |
| 4,629,330 | 12/1986 | Nichols ................................... 116/216 |
| 4,726,989 | 2/1988 | Mrozinski . |
| 4,846,095 | 7/1989 | Emslander . |
| 5,111,768 | 5/1992 | Larsson et al. . |
| 5,119,021 | 6/1992 | Taraci et al. ............................ 324/158 |
| 5,120,137 | 6/1992 | Ou-Yang . |
| 5,667,303 | 9/1997 | Arens et al. ............................ 374/162 |

TEMPERATURE INDICATING DEVICE

FIELD OF THE INVENTION

This invention relates to critical temperature indicating devices. More particularly, it relates to a critical temperature indicating device comprising an indicating composition that provides an irreversible visual signal to the user that a product has been exposed to a predetermined temperature.

BACKGROUND OF THE INVENTION

Blood, emulsions, pharmaceuticals, beverages, and other items are often chilled in order that they may be preserved for later use. If exposed to too low a temperature, however, the characteristics of these items may change so that they are undesirable for later use. In fact, many of these items may be rendered completely useless if exposed to too low a temperature, such as the freezing point of water. It is, therefore, desirable to provide an indicating device that will accurately show whether or not the item is exposed to a temperature below a critical value. It is also typically desirable for the device to provide its indication relatively rapidly and that the indication be irreversible so that the user will be alerted to a previously attained critical temperature, even if that condition is not maintained.

Critical temperature indicating devices are known that utilize the expansion characteristic of water to break a frangible ampule. That is, once the indicating device is exposed to a temperature below the freezing point of water, the volume increases as the water in the ampule changes to ice, thereby causing the ampule to break. After the ice is formed and the surrounding temperature returned to a point about the melting point of the ice, the resultant water is absorbed by a pad, thus providing an indication that the device had gone through a freeze stage and back through a thaw stage. Such indicating devices are not always accurate due to the super-cooling effect of water. Under some conditions, water may be cooled to as low as −16° C. without freezing. This problem has been partially overcome by the addition of nucleating agents to the water to enhance ice formation.

Water-based indicating devices are also known that utilize a microporous layer, water, and a second liquid that can wet out the microporous layer upon solidification of the water. See, U.S. Pat. No. 4,846,095 (Emslander). The micropores of the microporous layer cause scattering of transmitted light, causing the microporous layer to appear opaque. When the voids are filled with a liquid having substantially the same index of refraction as the material of the microporous layer, the filled voids do not significantly scatter transmitted light, thus rendering the microporous layer transmissive to visible light. The opacity of the microporous layer masks a visible indicator, which can be seen after the indicator is activated (i.e., after the second liquid enters the voids of the microporous layer). Emslander also discloses that a seeding agent or a salt can be added to the aqueous mixture to slightly modify the indicating temperature. Emslander further discloses that two nonaqueous compounds (ethanolamine and n-butanol), one of which solidifies and one of which wets out the microporous layer, can be used in the indicating devices containing a microporous layer.

Other temperature indicating devices are known that include organic compounds in a capillary tube or bulb attached to a capillary tube. See, for example, U.S. Pat. Nos. 4,457,252 and 4,457,253. These indicating devices utilize the volume reduction characteristics of organic compounds as they undergo a change from the liquid state to the solid state. Two organic liquids are separated by a porous plug and/or a separating liquid that is immiscible with the two organic liquids. One of the organic liquids is colored and has a freezing point that is higher than that of the other (colorless) organic liquid. At the critical temperature, the colorless organic liquid solidifies and the colored liquid is drawn into that portion of the capillary tube or bulb containing the colorless, solidified organic liquid, thereby providing a visual indication that the first compound solidified.

Even with these nonaqueous indicating devices, there is a need for additional indicating devices, particularly those that are responsive relatively rapidly and reproducibly within a relatively narrow temperature range. Furthermore, there is a need for additional indicating devices that are capable of being readily modified to a wide range of critical temperatures.

SUMMARY OF THE INVENTION

The present invention provides a device for indicating if an object is exposed to a critical temperature; the indicating device comprising:
  (a) a microporous membrane;
  (b) an indicating composition containing less than about 10 wt-% water; the composition comprising:
    (i) a major amount of a primary organic component comprising at least one compound that has a freezing point above the critical temperature and does not spontaneously wet out the microporous membrane at a temperature at least about 30° C. above the critical temperature;
    (ii) a modifying component comprising at least one compound that has a freezing point below the critical temperature; and
    (iii) a wetting component comprising at least one compound that has a freezing point below the critical temperature and is capable of spontaneously wetting out the microporous membrane at about the critical temperature; and
  (c) means for containing the microporous membrane and the indicating composition;
wherein the primary organic component, modifying component, and wetting component are miscible liquids above the critical temperature, and are present in a ratio such that the composition does not spontaneously wet out the microporous membrane at a temperature at least about 30° C. above the critical temperature, but does wet it out at about the critical temperature upon solidification of a portion of the composition.

The present invention also provides a device for indicating if an object is exposed to a critical temperature; the indicating device comprising:
  (a) a microporous membrane;
  (b) an indicating composition containing less than about 1 wt-% water; the composition comprising:
    (i) at least about 50 wt-% of a primary organic component comprising at least one compound that has a freezing point above the critical temperature and does not spontaneously wet out the microporous membrane at a temperature at least about 30° C. above the critical temperature;
    (ii) no greater than about 40 wt-% of a modifying component comprising at least one compound that has a freezing point below the critical temperature; and
    (iii) no greater than about 20 wt-% of a wetting component comprising at least one compound that has a freezing point below the critical temperature and is capable of spontaneously wetting out the microporous membrane at about the critical temperature; and (c) means for containing the microporous membrane and the indicating composition;

wherein the primary organic component, modifying component, and wetting component are miscible liquids above the critical temperature, and are present in a ratio such that the composition does not spontaneously wet out the microporous membrane at a temperature at least about 30° C. above the critical temperature, but does spontaneously wet it out at about the critical temperature upon solidification of a portion of the composition.

A further embodiment of the present invention is a device for indicating if an object is exposed to a critical temperature; the indicating device comprising:

(a) a microporous membrane comprising a polyolefin;
(b) an indicating composition containing less than about 1 wt-% water; the composition comprising:
  (i) at least about 50 wt-% of a primary organic component comprising at least one polyfunctional alcohol that has a freezing point above the critical temperature and does not spontaneously wet out the microporous membrane at a temperature at least about 30° C. above the critical temperature;
  (ii) no greater than about 40 wt-% of a modifying component comprising at least one polyfunctional alcohol that has a freezing point below the critical temperature; and
  (iii) no greater than about 20 wt-% of a wetting component comprising at least one compound selected from the group consisting of alcohols, ketones, ethers, alkanes, alkenes, amines, and combinations thereof; wherein the compound has a freezing point below the critical temperature and is capable of spontaneously wetting out the microporous membrane at about the critical temperature; and
(c) means for containing the microporous membrane and the indicating composition and retarding transmission of water vapor into the indicating composition;

wherein the primary organic component, modifying component, and wetting component are miscible liquids above the critical temperature, and are present in a ratio such that the composition does not spontaneously wet out the microporous membrane at a temperature at least about 30° C. above the critical temperature, but does spontaneously wet it out at about the critical temperature upon solidification of a portion of the composition.

In this application,

"activated" refers to the condition of the indicating device wherein the microporous membrane has been "wetted out" thereby providing an irreversible indication (e.g., a message or a colored composition) that the device has been exposed to the critical temperature for which it was designed;

"critical temperature" refers to the temperature at, or below which, the object being monitored is damaged such that it is undesirable for later use; at this temperature, a portion of the indicating composition solidifies sufficiently to change the surface tension of the indicating composition and cause wetting out of the pores of the microporous membrane;

"microporous membrane" refers to a polymeric material having a void volume (i.e., the total amount of space not occupied by polymer) ranging from about 20% to about 90% which is characterized by having open porosity (i.e., external pores or pores open to the surface of the membrane) with interconnected channels;

"miscible liquids" refers to a combination of two or more liquids that form a clear solution upon viewing by the unaided eye;

"response time" refers to the time required for the indicating device of the present invention to be activated at the critical temperature for which it is designed;

"surface energy" refers to the critical wetting tension ($\gamma_c$) of a solid, which is equal to the surface tension of a liquid that would yield a zero contact angle when placed in contact with the solid (i.e., when the liquid completely wets out the solid);

"surface tension" refers to the force acting on the surface of a liquid tending to minimize the area of the surface and is equal to the free energy per unit surface area; and "spontaneous wet out" refers to entry of a portion of the liquid indicating composition into the pores of the microporous membrane in the absence of a pressure gradient across the membrane; the portion of the liquid indicating composition that enters the pores of the microporous membrane includes at least the wetting component, but it also may include the modifying component and/or nonsolidified primary component.

DETAILED DESCRIPTION

The present invention provides a device for indicating whether an object has been exposed to a critical temperature (i.e., a predetermined temperature below which the object should not be exposed). The indicating device includes: a microporous membrane; an indicating composition containing less than about 10 percent by weight (wt-%) water, based on the total weight of the indicating composition; and means for containing the microporous membrane and the indicating composition, and preferably, retarding the transmission of water vapor into the indicating composition. Preferably, the indicating composition contains less than about 1 wt-% water.

Typically, indicating devices containing less than about 10 wt-% water are not subject to the problems associated with super-cooling. They tend to be relatively rapidly responsive. For example, preferred indicating devices of the present invention have a response time of no greater than about 60 minutes (more preferably, no greater than about 45 minutes, and most preferably, no greater than about 30 minutes). They also tend to be more precise and reproducible within a relatively narrow temperature range. For example, indicating devices of the present invention are preferably capable of being activated within ±2° C. of the critical temperature of the object being monitored using the test method described herein, which generally involves a cooling rate of about 1° C. per 30 minutes.

The indicating composition can be a solution, a dispersion, a gel (i.e., a high viscosity solution or dispersion), or the like. It includes at least three components:

a first organic component (i.e., the primary organic component) that includes at least one compound that has a freezing point above the critical temperature and does not spontaneously wet out the microporous membrane at a temperature at least about 30° C. above the desired critical temperature of the object (e.g., pharmaceutical substance, plant material, microorganism, etc.) being monitored; a second component (i.e., the modifying component) that includes at least one compound that has a freezing point below the critical temperature (i.e., it is a liquid at the critical temperature and is used to modify the temperature at which the indicating device is activated); and a third component (i.e., the wetting component) that includes at least one compound that has a freezing point below the critical temperature and is capable of spontaneously wetting out the microporous membrane at the critical temperature. The primary organic component, modifying component, and wetting component are miscible liquids above the critical temperature. They are present in a ratio such that the indicating composition does not spontaneously wet out the microporous membrane at a temperature at least about 30° C. (preferably, at least about 45° C., and more preferably, at least about 60° C.) above the critical temperature, but does spontaneously wet out the microporous membrane at about the critical temperature upon solidification of a portion of the composition.

At about the critical temperature, at least the primary organic component solidifies out of the indicating composition, although either or both the wetting component and the modifying component may also solidify with the primary organic component. While not being bound by theory, it is believed that this results in an increase in concentration of the wetting component in the nonsolidified (i.e., remaining liquid) portion of the indicating composition, which causes spontaneous wet out of the microporous membrane at about the critical temperature. It will be understood by one of skill in the art that the microporous membrane may be wet out by a mixture of the wetting component and other nonsolidified components of the indicating composition; however, at least the wetting component will wet out the microporous membrane.

An indicating composition that includes a modifying component provides advantage over an indicating composition that includes only a primary component that solidifies and a wetting component. Such indicating compositions that include the modifying component provide indicating devices that are capable of being readily modified to a wide range of critical temperatures. Furthermore, the temperature at which the indicating device is activated can be precisely adjusted by adjusting the relative amounts of the primary organic component, the modifying component, and the wetting component. This provides a greater number of temperatures generally over a broader temperature range to which a combination of any three components can be tailored, as well as a precise adjustment of the temperature.

Thus, the temperature at which the primary organic component solidifies can be modified through the use of the modifying component. The pure form of the primary organic component (or pure forms of the individual compounds of the primary organic component if more than one compound is used) has a freezing point above (preferably, at least about 5° C. above) the critical temperature for which the indicating device is designed. The pure form of the modifying component (or pure forms of the individual compounds of the modifying component if more than one compound is used) has a freezing point below (preferably, at least about 5° C. below) the critical temperature for which the indicating device is designed. The modifying component may cocrystallize with the primary organic component or may simply depress its freezing point. Thus, the temperature at which the primary organic component solidifies (i.e., its freezing temperature) when pure is higher than the temperature at which solidification occurs in the indicating composition. Upon the temperature dropping to or below the critical temperature, a portion of the indicating composition solidifies, the concentration of the wetting component in the liquid portion of the indicating composition increases, thereby causing the spontaneous wet out of the microporous membrane. This is what is believed to occur when the indicating device is "activated." As stated above, at least the wetting component enters the pores of the microporous membrane, although a mixture of the wetting component and other nonsolidified components of the indicating composition may also enter the pores of the microporous membrane with the wetting component.

This wetting out of the microporous membrane can cause the membrane to become generally transparent (i.e., to transmit visible light), or at least translucent. Thus, as in U.S. Pat. No. 4,846,095 (Emslander), the device is a visual indicator in that the membrane is initially opaque and becomes transparent, or at least translucent, when it is wetted out. Under normal conditions of use (i.e., temperatures of about 0–60° C. without a pressure gradient across the membrane), the membrane will stay generally transparent or translucent. If colorant, such as a dye or pigment, is present, however, the membrane will not necessarily become transparent or even translucent. Rather, the colorant can be carried into the pores of the membrane and thereby change the color of the membrane. This change in opacity and/or color indicates that the temperature has dropped to, or below, the critical temperature to be indicated.

The indicating device of the present invention can be in a variety of configurations. That is, means for containing the indicating composition and microporous membrane can be in the form of a pouch, a blister pack, etc. The container is formed from one or more materials that can be shaped and sealed to form a reservoir to hold the indicating composition and microporous membrane. These materials are preferably barrier materials for holding out moisture and environmental gases. Barrier materials are typically used when one or more of the components of the indicating composition is hygroscopic.

Figure 1:
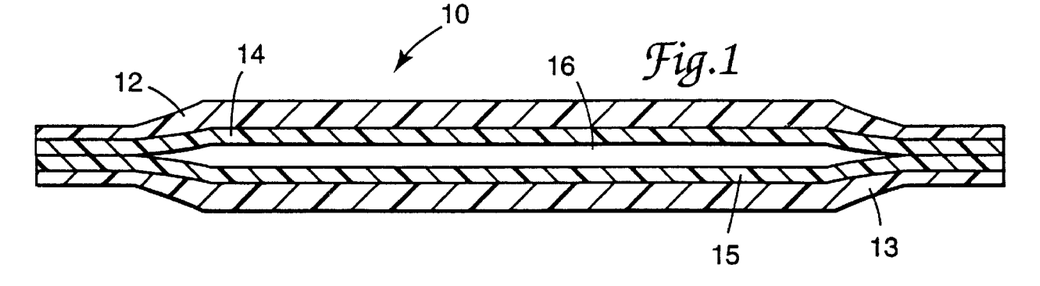
FIG. 1 is a sectional view of one embodiment of the indicating device of this invention.

Referring now to FIG. 1, the temperature indicating device 10 includes two layers 12 and 13 of barrier material, each of which is bonded to a microporous membrane 14 and 15, thereby forming reservoir 16 between microporous membranes 14 and 15. The microporous membranes may be bonded to the barrier layers about their periphery, or across the entire membrane. That is, microporous membrane 14, for example, can be bonded to barrier layer 12 about the periphery of the membrane. Alternatively, the entire surface of the membrane can be bonded to the barrier layer. Barrier layers 12 and 13 are preferably bonded to microporous membranes 14 and 15 by heat sealing, although an adhesive or alternative means of bonding could be used. Reservoir 16 contains the indicating composition. It is believed that once the indicating device is exposed to the critical temperature for which it is designed, at least the primary organic component solidifies (which may cocrystallize with either the modifying component or the wetting component or both) and the concentration of the wetting component increases in the liquid phase to a point where this nonsolidified portion of the indicating composition (at least the wetting component) spontaneously wets out the microporous membrane. If the indicating composition includes a colorant, the indicating composition becomes visible as a result of the microporous membrane losing its opacity and/or as a result of the colorant entering the pores of the microporous membrane.

The indicating device shown in FIG. 1 can be in a variety of shapes, such as a rectangular, square, or circular flat pouch. One surface of the indicating device can have a layer of adhesive disposed thereon for attaching to a surface of the object to be monitored. In such embodiments, there may only be one microporous membrane. That is, the reservoir 16 would be formed between a barrier layer and a layer of microporous membrane on one side and simply a barrier layer on the other side. When in position on the object to be monitored, the side of the indicating device with only the barrier layer would be closest to the object to be monitored.

The reservoir can also be formed by a washer (i.e., a flat ring) made of a nonporous material, such as a thermoplastic, thermoset, or metallic material. This washer is adhered to a layer of a barrier material on one side, and a second layer of a barrier material with a microporous membrane adhered thereto is adhered to the other side of the washer. The reservoir is thereby formed for placement of the indicating composition.

A layer of adhesive on a release liner could also be a temporary barrier, thereby eliminating the need for a barrier layer at least on one side of the indicating device. Once the release liner is removed, the adhesive could be placed against a glass container, or some other object, that could act as a barrier. Alternatively, if the adhesive is sufficiently hydrophobic (e.g., a rubber-based adhesive), it may serve as a barrier even when placed on a porous substrate.

The barrier material not only provides the container for the indicating composition and microporous membrane, but it can provide a barrier to retard the evaporation of the components of the indicating composition and it acts to seal out water and water vapor, which may adversely affect the reproducibility and precision of the indicating device. The barrier material is typically at least partially transmissive to visible light so that the visible indicator may be seen therethrough once the indicating device has been activated. If the barrier material is attached to a surface of the object being monitored and is therefore on the "backside" of the indicating device, however, it does not need to be transmissive to visible light. Thus, an indicating device can include more than one type of barrier material, as long as at least a portion of the barrier material is at least partially transmissive to visible light.

Figure 2:
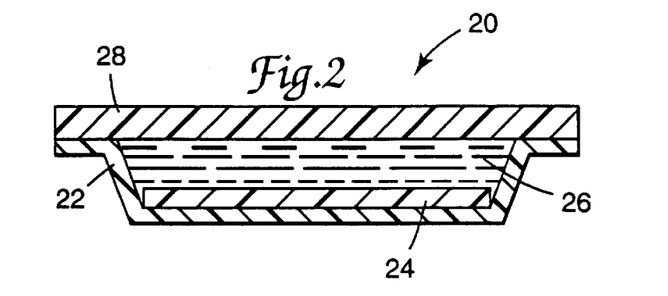
FIG. 2 is a sectional view of a second embodiment of the indicating device of this invention.

Referring now to FIG. 2, the temperature indicating device 20 includes a thermoformed barrier material 22 and a microporous membrane 24 bonded thereto, and backing 28 bonded to the periphery of the thermoformed barrier material 22, thereby forming reservoir 26 for the indicating composition. Thermoformed barrier material 22 is preferably bonded to microporous membrane 24 using a layer of adhesive (not shown) about the periphery of the membrane, although other means of bonding can be used (e.g., thermal and ultrasonic welding). Generally, if the entire surface of microporous membrane 24 were bonded to thermoformed barrier material 22, this would not necessarily prevent it from being wetted out. In this embodiment, backing 28 is not transmissive to visible light, although it could be if desired. In fact, backing 28 could be made of the same material as thermoformed barrier material 22, although it is generally preferred that the backing 28 be made of a metallic foil, plastic, or a laminate that has a sufficiently low water vapor transmission rate and that prevents the transmission of visible light. The backing 28 can be coated with a heat sealable material such that it can be thermally bonded to the thermoformed barrier material 22, although an adhesive could be used.

Again referring to FIG. 2, the backing 28 can bear an image (e.g., "REJECT" or "FROZEN") thereon that cannot be seen through microporous membrane 24 prior to the indicating device being activated. Once activated, however, the image could be seen through the thermoformed barrier material 22 and the microporous membrane 24. Alternatively, the indicating composition could include a colorant that would be seen upon wetting out of the microporous membrane, or the indicating composition could be colorless and backing 28 could be colored.

Figure 3:
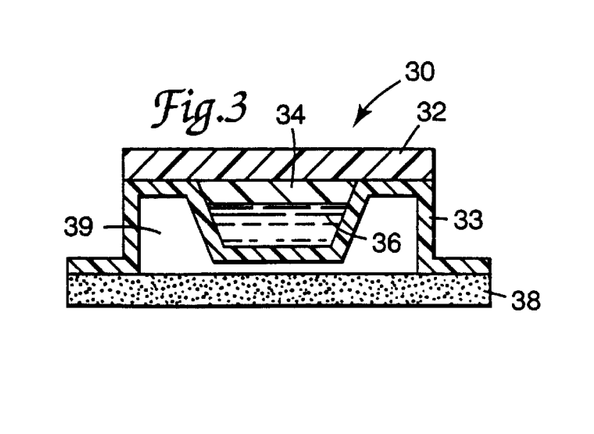
FIG. 3 is a sectional view of a third embodiment of the indicating device of this invention.

Referring now to FIG. 3, the temperature indicating device 30 includes a layer 32 of barrier material, thermoformed barrier material 33, and microporous membrane 34. The microporous membrane 34 is bonded to the barrier material 32, preferably by heat sealing, although an adhesive layer or other means of sealing could be used. The barrier material 32 is bonded to thermoformed barrier material 33, thereby forming reservoir 36 for the indicating composition. Alternatively, the microporous membrane 34 can be fused between the barrier material 32 and the thermoformed barrier material 33 depending on the materials used. Thermoformed barrier material 33 is backed with an adhesive layer 38 forming hollow space 39. Adhesive layer 38 is used to attach the indicating device to the surface of the object to be monitored. Thus, barrier material 32 is at least partially transmissive to visible light because that is the portion of the indicating device through which a person would look. Generally, the indicating composition in this embodiment would include a colorant, such that it would become visible as a result of the microporous membrane losing its opacity and/or as a result of the colorant entering the pores of the microporous membrane.

Figure 4:
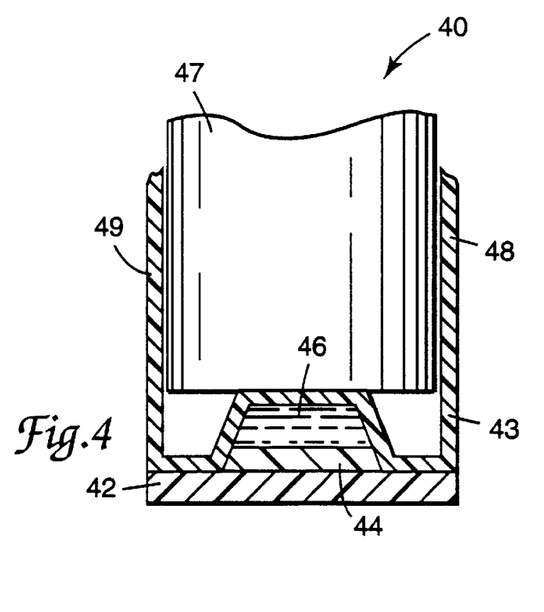
FIG. 4 is a sectional view of the embodiment of FIG. 3 adhered to an object being monitored.

Referring now to FIG. 4, the temperature indicating device 40 includes a layer 42 of barrier material, thermoformed barrier material 43, and microporous membrane 44. The microporous membrane 44 is bonded to the barrier material 42, preferably by heat sealing, although an adhesive layer or other means of sealing could be used. The barrier material 42 is bonded to thermoformed barrier material 43, thereby forming reservoir 46 for the indicating composition. Alternatively, the microporous membrane 44 can be fused between the barrier material 42 and the thermoformed barrier material 43 depending on the materials used. Indicating device 40 is positioned against container 47 and held in place by extensions 48 and 49 of thermoformed barrier material 43. Alternatively, or additionally, indicating device 40 can be held in place by adhesive positioned between the surfaces of the indicating device and the container that are in contact.

Polymeric microporous membranes (depicted as, for example, 14 and 15 in FIG. 1) may be made from polyolefins such as polypropylene and polyethylene, polysulfones, polytetrafluoroethylene (PTFE), polyamide, polyester, cellulose acetate and other cellulose derivatives, and the like, as well as from combinations of these polymers. Preferred microporous membranes include polyolefins such as polyethylene or polypropylene. Microporous membranes may be produced by solvent casting of polymers, or by a phase separation processes, for example. The surface energy of the membranes can be modified by corona treating, flame treating, or by adding a surface active agent, for example.

Suitable microporous membranes have a void volume of about 20–90%, more preferably about 40–85%. Preferably, the structure is characterized by having open porosity with interconnected channels. An example of a material that is suitable for use as the microporous membrane is described in U.S. Pat. No. 4,726,989 (Mrozinski), which is incorporated herein by reference. This microporous membrane includes a multiplicity of spaced, randomly dispersed, non-uniformly shaped, equiaxed (i.e., approximately equal dimensions in all directions) particles of a crystallizable thermoplastic polymer (e.g., a polyolefin such as polypropylene) coated with a compound with which the thermoplastic polymer is miscible. These particles are separated from one another to provide a network of interconnected micropores, yet they are connected to one another by fibrils of the thermoplastic polymer. Furthermore, these particles include a nucleating agent in the interior of the particles. They are made by a phase separation process and are often referred to as thermally induced phase separation membranes (i.e., "TIPS" membranes). Such membranes are commercially available from 3M Company of St. Paul, Minn.

Commercially available microporous membranes include a particle-filled polyethylene commercially available under the trade designation "EXXAIRE FILM" from Exxon Chemical Co. of Florida, Tex., and polypropylene membranes commercially available under the trade designation "AKZO" from Akzona of Germany or "CELGARD" from Hoechst Celanese of Sommerville, N.J. Also available are particle-filled microporous membranes available under the trade designation "EXEPORE" from Mitsubishi Chemical of Yokohama, Japan.

The micropores of the microporous membrane cause scattering of incident light, causing the microporous membrane to appear opaque. When the voids are substantially filled with a liquid having substantially the same index of refraction as the material of the microporous membrane, the substantially filled voids result in a dramatic decrease in scattering, thus rendering the microporous layer transmissive to visible light. If, however, the indicating composition of the present invention includes a colorant, the wetting compound does not have to have substantially the same index of refraction; rather, it merely needs to be able to wet out the microporous membrane. Even if the temperature exceeds the critical temperature for which the indicating device was designed, after it has been activated (yet is still within a reasonable temperature of about 0–60° C. and there is no pressure gradient across the membrane), the wetting compound is generally unable to leave the pores, thereby rendering their microporous membrane generally irreversibly transparent, translucent, or with colorant therein.

Preferred barrier materials provide a barrier to water vapor, environmental gases, etc., such that they do not contaminate the indicating composition in the device. Preferably, the barrier material has a water vapor transmission rate (WVTR) of less than about 1 gram/meter$^2$ in 24 hours, as measured according to American Society for Testing Materials (ASTM) Test Method F-1249-90 on a MOCON Permatran at 38° C. and 90% relative humidity. More preferably, it has a WVTR of less than about 0.5 gram/meter$^2$ in 24 hours, and most preferably, less than about 0.1 gram/meter$^2$ in 24 hours. It is desirable to keep water vapor (and water) out of the indicating composition (except for the small amount that may be used as a modifying compound) to ensure reproducibility, precision, and relatively short response times.

Typically, the barrier material is at least partially transmissive to visible light, although it can be completely opaque. Suitable barrier materials (depicted as, for example, 12 and 13 in FIG. 1) include polymeric films, metallized polymeric films, metallic foils, and laminates comprising films and foils. As stated above, when used on both sides of the construction, at least one of the layers of barrier material is at least partially transmissive to visible light, so that the change in the opacity of the membrane is visible when the critical temperature is reached. The preferred barrier materials are such polymeric films as fluoropolymers, polyolefins such as polyethylene, polyesters, halogenated polyolefins such as polyvinyl chloride, metallized polyesters, and metallic foils such as aluminum.

Suitable commercially available barrier materials include laminated materials. One such laminate is a polymeric laminate commercially available under the product designation "MIL-B-22191, Type 1, Class 2" from Georgia Packaging, Inc. of Columbus, Ga. This material has a WVTR of 0.34 g/m$^2$/24 hours and includes a layer of a thermoplastic fluoropolymer having high moisture barrier properties commercially available under the trade designation "ACLAR" from Allied Signal of Morristown, N.J. It also includes two layers of low density polyethylene (PE) and a layer of polyethylene terephthalate (PET). Specifically, this material includes a layer of 0.015 mm "ACLAR RX160" (WVTR=0.42 g/m$^2$/24 hours), a layer of 0.012 mm polyethylene terephthalate (PET), and a layer of 0.064 mm low density polyethylene (LDPE). Between the layer of "ACLAR RX160" and the layer of PET is a layer of 0.017 mm LDPE, which acts as an adhesive to bond these two films together. Other suitable polymeric laminates include one formed from a layer of 0.19 mm polyvinyl chloride (PVC), 0.051 mm PE, 0.015 mm "ACLARRXI60," and 0.051 mm PE, which is available under the product designation "VPA 760," and one formed from a layer of 0.19 mm PVC, 0.051 mm LDPE, 0.015 mm "ACLAR RX160," and 0.051 mm LDPE, which is available under the product designation "VPA 790," both of which are available from TekniPlex, Inc. of Somerville, N.J.

Preferred barrier materials may be thermoplastic and thus thermoformable. Thermoforming is used to produce a desired profile for the barrier material, as depicted, for example, in FIGS. 2, 3, and 4. Thermoforming is carried out by techniques well known to those in the art. Typically, the material is positioned on a heated, shaped platen and pressed or vacuum formed into a desired shape. The thermoformable material is used in making blister packages. For example, such shaped materials are particularly useful for protecting gelatin capsules for the pharmaceutical industry. Examples of thermoformable materials include polyvinyl chlorides, polystyrenes, polycarbonates, cellulosics, and the like. Preferred thermoformable barrier materials are laminated "ACLAR" materials, which are commercially available from TekniPlex, Inc. of Somerville, N.J. One such material includes a layer of 0.038 mm "ACLAR 22A" (WVTR=0.34 g/m$^2$/24 hours), a layer of 0.051 mm low density polyethylene, and a layer 0.19 mm polyvinyl chloride. Another such material includes a layer of 0.023 mm "ACLAR SupRx900" (WVTR=0.26 g/m$^2$/24 hours) and a layer of 0.19 mm polyvinyl chloride. Other laminated materials can be made to desired specifications. In addition to being thermoformable, these materials are heat sealable.

Other materials that can be used as the barrier material include metallic foils and other materials that are capable of being cold formed. For example, aluminum foil (e.g., about 7.5–75 micrometers thick) can be formed into a desired shape and used as the barrier material. If desired, the metallic foil can be coated with a heat sealable coating. Such coating materials are commercially available. Examples include vinylic and acrylic heat seal coatings available under the product designations "4506" and "4514" from Lawson Mardon of Arlington Heights, Ill.

Although barrier materials having WVTR values of less than about 1 g/m$^2$/24 hours are preferred, this is not a requirement. Materials that are permeable to water vapor and/or environmental gases can be used to form the containment means; however, such materials are not suitable for highly hygroscopic indicating compositions. Thus, a wide variety of materials can be used to form the barrier material. Examples include, a polyester copolymer available under the trade designation "SCOTCHPAK 146" from the 3M Company of St. Paul, Minn. as well as other "SCOTCH-PAK" strippable lid films.

The barrier material may have an image applied thereto, which will be masked when the pores of the microporous membrane are not wetted out (i.e., when the microporous membrane appears opaque), but will be visible when the pores of the microporous membrane are wetted out (thus appearing transparent or translucent). For example, the image can be a printed message on at least one major surface. The printed layer is typically formed from an appropriate printing ink and/or embossed directly into the material. In such embodiments, this layer of barrier material is referred to as a backing (see FIG. 2), and the barrier material is opaque. Preferably, the barrier material (e.g., the backing) is a metallic foil such as aluminum foil. Thus, the metallic foil may have paper adhered to one surface to allow placement of the text or graphics.

To prepare the indicating device shown in FIG. 1, a laminate is formed comprising a first microporous membrane adhered to a first barrier layer. It may be adhered with adhesive or by heat sealing about the outer periphery. Two pieces of this laminate are then placed in a facing relationship such that the microporous membrane sides face each other and sealed about the outer periphery. This creates a reservoir for the indicating composition. Alternatively, the microporous membrane is adhered to a first barrier layer and used with at least one other barrier layer to form a receptacle. For example, the membrane is heat sealed to a first transparent barrier layer, and then this construction is heat sealed to a second barrier layer, such as heat sealed aluminum foil. The reservoir is formed by the microporous membrane and the second barrier layer.

The indicating composition contains less than about 10 wt-% water. Preferably, it contains less than about 1 wt-% water. Compositions with less than about 10 wt-% water, and particularly with less than about 1 wt-%, provide indicating devices with good precision and reproducibility. For example, they will preferably be reproducibly activated within about ±2° C., and more preferably, within about ±1° C., of the desired critical temperature, using the test method described in the examples section, which generally involves a cooling rate of 1° C./30 minutes. Compositions with less than about 10 wt-% water provide indicating devices with relatively short response times. For example, the indicating devices of the present invention preferably respond in no greater than about 60 minutes, more preferably, in no greater than about 45 minutes, and most preferably, in no greater than about 30 minutes. Furthermore, they make it possible to indicate at temperatures other than 0° C.

The primary organic component includes compounds that do not wet out the microporous membrane under normal use and/or transportation conditions. Typically, suitable compounds for use in the primary organic component do not spontaneously wet out the microporous membrane at a temperature at least about 30° C. above the critical temperature. Preferred such compounds do not spontaneously wet it out at a temperature at least about 45° C. (and more preferably, at least about 60° C.) above the critical temperature. The wetting component includes compounds that do spontaneously wet out the microporous membrane at about the critical temperature. In its initial state (i.e., prior to being activated), the indicating composition does not spontaneously wet out the microporous membrane at a temperature at least about 30° C. above the critical temperature for which the indicating device is designed. It is believed that at or below about the desired critical temperature (i.e., the temperature to be avoided), a sufficient amount of the primary organic component solidifies, causing the concentration of the wetting component to increase in the liquid portion of the indicating composition, allowing the remaining liquid portion (i.e., the nonsolidified portion) of the indicating composition (at least the wetting component) to wet out the pores of the microporous membrane by reducing the surface tension of the indicating composition.

When the nonsolidified portion of the indicating composition (i.e., the wetting component or a mixture of the wetting component and other components of the indicating composition) enters the pores of the microporous membrane, the membrane becomes at least partially transmissive to visible light. If a colorant (i.e., a pigment or dye) is present, the color will be apparent when the membrane becomes transparent. If a soluble colorant is in the indicating composition, the colorant can be carried into the pores of the microporous membrane. The microporous membrane then changes from opaque (white) to the color of the colorant (e.g., dye).

When a colorant is used, it is preferably soluble in the indicating composition within the temperature range over which the indicating device is to be used. The colorant, typically in the form of a pigment or dye, can penetrate the pores of the microporous membrane once the temperature has dropped to about the critical temperature. It can also remain in the pores even if the indicating device is exposed to elevated temperatures within normal use and transportation conditions. The color imparted to the device by the colorant should be easily seen by the unaided eye. Preferably, the colorant is generally safe for human contact, such as a food-grade dye. Preferred dyes are commercially available under the product designations "ERIOGLAUCINE" (blue CI 42090), "ERITHROSIN B" (red CI 45430), "TARTRAZINE" (yellow CI 19140), and "FAST GREEN FCF" (green CI 42053) from Aldrich Chemical Co. of Milwaukee, Wis.. The colorant is added in an amount sufficient to color the indicating composition and make the color change apparent to the unaided eye when the indicating device has been exposed to the critical temperature. Typically, this ranges from about 0.01 wt-% to about 0.5 wt-%, based on the weight of the indicating composition. It is preferred to use small amounts of colorant because they may affect the freezing point of the solution and because they are expensive.

The primary organic component includes at least one organic compound that does not enter the pores of the microporous membrane when in the pure state at least in the absence of a pressure gradient across the membrane at a temperature at least about 30° C. above the critical temperature for which the indicating device is designed. Preferred such compounds do not spontaneously wet it out at a temperature at least about 45° C. (and more preferably, at least about 60° C.) above the critical temperature. Such compounds have a generally high dipole moment resulting in a generally high surface tension. Preferably, the surface tension is greater than about 30 dynes/cm, more preferably, greater than about 35 dynes/cm, and most preferably, greater than about 40 dynes/cm, as measured using ASTM Test Method D1331-89, Method A, at 23° C. for materials that are liquid at this temperature. For materials that are solids at this temperature, the surface tension is measured at 5° C. above the freezing point. The surface tension of the primary organic component is greater than the surface energy of the microporous membrane chosen. For example, for a microporous membrane made of polypropylene, the surface energy is about 30 dynes/cm. Thus, suitable compounds for the primary organic component have a surface tension greater than about 30 dynes/cm when the microporous membrane is polypropylene. Preferably, compounds used in the primary organic component have a viscosity greater than about 10 centipoise, more preferably, greater than about 30 centipoise, and most preferably, greater than about 50 centipoise, measured at 23° C. for materials that are liquid at this temperature. For materials that are solids at this temperature, the viscosity is measured at 5° C. above the freezing point (i.e., melting point).

The freezing point of the compounds suitable for use in the primary organic component is above (preferably, at least about 5° C. above, more preferably, at least about 10° C. above, and most preferably, at least about 15° C. above) the desired critical temperature. Generally, the freezing point of such compounds are no more than about 60° C. above the desired critical temperature. Suitable compounds include polyfunctional alcohols such as 1,3-propanediol, ethylene glycol, di(ethylene glycol), glycerol, tripropylene glycol, as well as polyethoxylated derivatives of these glycols, and polyethylene glycol. Other suitable compounds include very polar esters and arnides, for example. Preferably, the primary organic component comprises at least one polyfunctional alcohol.

The modifying component includes at least one compound that has a freezing point below (preferably, at least about 5° C. below, more preferably, at least about 10° C. below, and most preferably, at least about 15° C. below) the desired critical temperature. Generally, the freezing point of such compounds are no more than about 60° C. below the desired critical temperature. Preferably, such compounds do not spontaneously enter the pores of the microporous membrane when in a pure state in the absence of a pressure gradient across the membrane at a temperature at least about 30° C. above the critical temperature (although when mixed with the wetting component, the modifying component may contribute to the wet out of the membrane). More preferably, compounds suitable for use in the modifying component do not spontaneously wet out the microporous membrane at a temperature at least about 45° C. (and most preferably, at least about 60° C.) above the critical temperature.

Preferred compounds suitable for use in the modifying component have a generally high dipole moment resulting in a generally high surface tension. Preferably, the surface tension is greater than about 30 dynes/cm, more preferably, greater than about 35 dynes/cm, and most preferably, greater than about 40 dynes/cm, as measured using ASTM Test Method D133 1-89, Method A, at 23° C. for materials that are liquid at this temperature. For materials that are solids at this temperature, the surface tension is measured at 5° C. above the freezing point. The surface tension of the preferred modifying component is greater than the surface energy of the microporous membrane chosen. For example, for a microporous membrane made of polypropylene, the surface energy is about 30 dynes/cm. Thus, suitable compounds for the modifying component have a surface tension greater than about 30 dynes/cm when the microporous membrane is polypropylene.

Preferably, compounds used in the modifying component have a viscosity greater than about 10 centipoise, more preferably, greater than about 30 centipoise, and most preferably, greater than about 50 centipoise, measured at 23° C. for materials that are liquid at this temperature. For materials that are solids at this temperature, the viscosity is measured at 5° C. above the freezing point. Suitable compounds include polyfunctional alcohols such as 1,3-butanediol, 1,4-butanediol, 2,3-butanediol, 1,3-propanediol, triethanol amine, ethylene glycol, di(ethylene glycol), triethylene glycol, propylene glycol, glycerol, tripropylene glycol, as well as polyethoxylated derivatives of these glycols, polyethylene glycol, and block copolymers of ethylene glycol and propylene glycol. Other suitable compounds include very polar esters and amides, for example. Preferably, the modifying component comprises at least one polyfunctional alcohol.

The wetting component includes at least one organic compound that is capable of wetting out the pores of the microporous membrane when in the pure state at about the critical temperature in the absence of a pressure gradient across the membrane. Such compounds have characteristics such as a generally low viscosity and a generally low surface tension. Preferably, the viscosity is less than about 50 centipoise, more preferably, less than about 25 centipoise, and most preferably, less than about 10 centipoise, at 23° C. for materials that are liquid at this temperature. For materials that are solids at this temperature, the viscosity is measured at 5° C. above the freezing point. For effective wet out, the surface tension of the wetting component is less than the surface energy of the microporous membrane chosen. Preferably, the surface tension of compounds used in the wetting component is less than about 30 dynes/cm, more preferably, less than about 27 dynes/cm at 23° C. for materials that are liquid at this temperature. For materials that are solids at this temperature, the surface tension is measured at 5° C. above the freezing point. Suitable wetting compounds include alcohols, ketones, ethers, halogenated or nonhalogenated alkanes, halogenated or nonhalogenated alkenes, amines, and combinations thereof Preferably, the wetting compounds include propylene glycols having a weight average molecular weight of less than about 2000, ($C_1$–$C_8$)alcohols (e.g., methanol, ethanol, propanol, and butanol), ($C_2$–$C_8$)ketones (e.g., acetone, 2-butanone), ($C_2$–$C_8$)ethers, ($C_5$–$C_8$)alkanes (e.g., heptane), halogenated ($C_5$–$C_{18}$)alkanes (e.g., trichloroethane), ($C_5$–$C_{18}$)alkenes, halogenated ($C_5$–$C_{18}$)alkenes, and ($C_1$–$C_8$)amines (e.g., ethylamine and diethylamine).

When selecting the compounds to be used in the primary organic component, the modifying component, and the wetting component, the following parameters are typically considered. First, the freezing point of the primary organic component (whether one primary organic compound or a mixture of such compounds is used) should be at a higher temperature than the critical indicating temperature. Second, an amount of the wetting component (whether one wetting compound or a mixture of such compounds is used) is used to ensure wetting of the microporous membrane at about the critical indicating temperature, but not at useful temperatures greater than the critical indicating temperature. Third, the freezing point of the modifying component (whether one modifying compound or a mixture of such compounds is used) should be at a lower temperature than the critical indicating temperature. Fourth, an amount of the modifying component (whether one modifying compound or a mixture of such compounds is used) is used to adjust the indicating temperature of the device to the critical indicating temperature for the desired application. In practice, the order of addition of these components does not matter.

Typically, at least about 50 wt-% of the primary organic component is used in an indicating composition. Preferably, at least about 70 wt-% (more preferably, at least about 80 wt-%) and no greater than about 98 wt-% of the indicating composition is the primary organic component. Typically, at least about 1 wt-% of the wetting component is used in an indicating composition. Preferably, at least about 3 wt-% and no greater than about 20 wt-% (more preferably, no greater than about 15 wt-%, and most preferably, no greater than about 10 wt-%) of the indicating composition is the wetting component. Typically, at least about 1 wt-% of the modifying component is used in an indicating composition. Preferably, at least about 10 wt-% and no greater than about 40 wt-% (more preferably, no greater than about 30 wt-%) of the indicating composition is the modifying component. If water is used in the modifying component, no greater than about 10 wt-% of water is used. In preferred indicating compositions, there is less than about 1 wt-% water (whether intentionally added or through absorption by hygroscopic components of the composition). All weight percents are based on a percentage of the weight of the total indicating composition.

The desired ratio of these components depends upon the desired critical temperature. Furthermore, the ratio of any three components can be varied to obtain a wide variety of critical temperatures. This can be readily determined by a minor amount of experimentation. For example, for an indicating device that activates at the critical temperature of −0.5° C., the indicating composition includes about 81 wt-% 1,4-butanediol (primary organic component), about 14 wt-% propylene glycol (modifying component), and about 5 wt-% isopropanol (wetting component). For an indicating device that activates at the critical temperature of 3.0° C., the indicating composition includes about 85 wt-% 1,4-butanediol, about 10 wt-% propylene glycol, and about 5 wt-% isopropanol. For an indicating device that activates at the critical temperature of −5.0° C., the indicating composition includes about 75 wt-% 1,4-butanediol, about 20 wt-% propylene glycol, and about 5 wt-% isopropanol.

Other materials (preferably, those which are soluble in the indicating composition) can be added to control the freezing point and/or alter the viscosity of the solution. For example, immobilizing agents can be added to control the rate of diffusion and/or build viscosity. Immobilizing agents such as thickeners and viscosifiers can be added to increase the viscosity of the indicating composition, and even form a gel. A gel is desirable because it would be easier to dispense into a pouch of the device and it would leak less if there were a failure in the pouch seal. Examples of such thickeners and viscosifiers include modified celluloses; starches; proteins; polymers prepared from ethylenically unsaturated monomers such as acrylates, acrylamides, vinyl pyrrolidine, vinyl acetate, acrylonitrile, styrene, and the like; polyurethanes; fumed silicas (such as that available under the trade designations "AEROSIL" from Degussa AG of Frankfort, Germany or "Cab-O-Sil M5" from Cabot Corp. of Tuscosa, Ill.); and clays. Other immobilizing agents include immobilizing matrices such as fibrous materials made from woven or nonwoven natural or synthetic materials, such as Kraft blotter papers (such as that available under the trade designation "VERIGOD" blotting paper available from James River Corp. of Richmond, Va.), sponges, or flocked porous materials, and polypropylene nonwoven material (such as that available under the trade designation "THINSULATE" from 3M Company of St. Paul, Minn.); air laid web such as paper towels; and nonwoven hydrophilic materials (such as filter paper available from Whatman of Maidstone, England).

Nucleating agents can also be added (although it is envisioned that they are not necessary) to prevent supercooling and improve reproducibility. Examples of such nucleating agents include AgI, silica, fumed silica, ground glass, or other materials having a high surface area with a rough topology.

The indicating devices of the present invention are relatively easy to make. Generally, the only precaution that needs to be taken is to ensure that the indicating composition does not include any significant amount of water absorbed from the atmosphere. Standard handling techniques for this are known to one of skill in the art. Once the indicating composition is prepared, it is placed in the desired container, typically via pipette or microsyringe. Preferably it is filled in a way which eliminates air bubbles, although this is not a requirement. The container is sealed together completely, and the device is ready for use.

As discussed above, the container can be in a variety of shapes and sizes, as shown in FIGS. 1–4. The only requirement is that as the indicating composition and microporous membrane should be in contact prior to activation. Thus, the indicating device can include separate compartments to avoid activation during shipping from the point of manufacture to the point of use. For example, the indicating composition can be encased in a rupturable container, which is impermeable to the indicating composition. A preferred rupturable container is formed of polymeric material, and can be sealed by means of heat or adhesive. Prior to using the indicating device, the rupturable container should be broken, typically by hand pressure, so the indicating composition and microporous membrane come in contact.

When adhesive is used to bond various components together or to affix the indicating device to a substrate, the adhesives are preferably pressure-sensitive adhesives, such as, for example, silicone-based adhesives, e.g., polysiloxanes, acrylic-based adhesives, e.g., isooctyl acrylate/acrylic acid copolymers, rubber-based adhesives, e.g., styrene-isoprene-styrene block copolymers, styrene-butadiene-styrene block copolymers, and nitrile rubbers, e.g., acrylonitrile-butadiene, and mixtures of these. Pressure-sensitive adhesives are well-known to one of ordinary skill in the art. Also useful are foam adhesives and double sided tapes (such as "9579" tape or "409" carpet tape, which are commercially available from 3M Company of St. Paul, Minn.). Also useful are curable adhesives such as epoxies, silicones, cyanoacrylates, and the like. Hot melt and curable hot melt adhesives are also suitable. It is important when selecting and adhesive to ensure that the composition does not solubilize or soften the adhesive resulting in bond failure.

The indicating device may be attached to a product via adhesive. For example, it can be adhered to the top, bottom or side of a vial, can, jar, carton, or box. It can be customized with graphics and have a visible window on either front or back of the container to allow for inspection. For example, a word, phrase, or graphic could be imprinted in the inner side of the indicating device, such as on the microporous membrane, which would be obscured by the opacity of the membrane. Upon reaching the critical temperature, the membrane would become transparent (or at least translucent) making the word, phrase, or graphic visible. Alternatively, when colorant is incorporated into the device, there is a change in color in the microporous film which indicates the critical temperature has been reached. A word, phrase, or message could be imprinted on the membrane such that it is visible prior to activation. Upon activation, if the indicating composition contains a colorant of the same color as the printed message, the message would disappear.

The indicating device is useful when used as an indicator for flash frozen foods (such as poultry), paints, water-based adhesives, dairy products, plants, pharmaceuticals or water-based chemicals. It can be used to indicate when the product is exposed to undesirably low temperatures. It is useful as an indicator on food products, for instances where it is important that the temperature remain cold but not so cold that the product freezes, such as fresh poultry or frozen meat. It is also useful on pharmaceuticals and medicines, where the temperature should remain about +5° C. For example, at 5° C., vaccines are stable for up to one year; if exposed to temperatures of about 0° C., the reliability of the vaccines is questionable.

Objects and advantages of this invention are further illustrated by the following examples, but the particular materials and amounts thereof recited in these examples as well as other conditions and details, should not be construed to unduly limit this invention. All materials are commercially available except where stated or otherwise made apparent.

EXAMPLES

Determination of Indicating Temperature

To test for indicating temperatures, devices of the present invention were prepared and then tested at desired temperatures in a water bath. The devices were conditioned by holding for one hour in a desiccator prior to the test.

To determine the temperature at which the composition results in penetration of the pores of the membrane to render it transparent, a water bath (commercially available as NESLAB RTE-111 from Neslab Instruments of Newington, N.H.) controllable to temperatures ±0.1° C., was used. The temperature was set at a desired testing temperature and equilibrated for 30 minutes prior to testing a sample. The samples were placed on clips and completely immersed into the bath. They were held for 30 minutes in the bath, and then examined to see if any changes in the transparency of the microporous membrane had occurred. If the device had not been activated, the temperature was reduced 1° C. and held for 30 minutes. This procedure was repeated until activation occurred. A minimum of three samples were tested and averaged. Typically, five samples were used.

The membrane in the indicating device changes from opaque to transparent at the critical temperature, or if a dye is present, the membrane may change color to that of the dye.

Wet Out Test

To determine the utility of the components in the indicating composition, tests were carried out using microporous membrane available as an "oil-out" polypropylene microporous membrane from 3M Company of St. Paul, Minn. to determine wetting and non-wetting characteristics. The tests were carried out at room temperature.

Test 1: A section of microporous membrane was cut into 2.5 cm squares. The membrane was placed on a bench top. A 0.33 ml sample of the component was deposited via microsyringe onto the membrane. If the microporous membrane became transparent in 5–10 minutes, the component was considered to be a wetting component. If the membrane did not become transparent in this time interval, the component was considered a primary organic component or a modifying component. For components that are solids at room temperature (22–25° C.), exactly the same procedure was carried out, except that the component was warmed up until it was liquid and then tested with the liquid and membrane maintained at a temperature just above the freezing point (i.e., melting point).

Test 2: If the component was observed to wet out the membrane, the component was placed into an indicating device prepared as described in Example 1, below. The effect of the component was readily observed by seeing the changes in the membrane, which was covered by a transparent barrier layer. If the microporous membrane became transparent in 5–10 minutes, the component was considered to be a wetting component. If the membrane did not become transparent in this time interval, the component was considered a primary organic component or a modifying component. For components which were solids at room temperature (22°–25° C.), exactly the same procedure was carried out, except that the component was warmed up until it was liquid and then deposited into the reservoir in the indicating device, which was also held at this elevated temperature.

Test 3: If the component passed both Tests 1 and 2 (i.e., it wetted out the membrane), it was used as a wetting component in an indicating composition. Several suitable indicating solutions are shown in Table 2. Indicating compositions were made up and deposited via microsyringe into the device prepared as described in Example 1. To test the critical temperature of the device, it was placed in a freezer at a temperature of −15° C. It was checked at 30 minute intervals to see if the indicating composition had wet out the microporous membrane (thus rendering it transparent), and if it was solid rather than liquid.

Example 1

This example illustrates the preparation of a device of this invention wherein a receptacle is formed between two layers of microporous film. This construction is similar to that depicted in FIG. 1.

1) Adhering the microporous membrane to a barrier layer

A piece of microporous polypropylene membrane, commercially available as "oil-out" microporous membrane from the 3M Company of St. Paul, Minn., was cut to about 2.5 cm by about 305 cm. A piece of barrier layer material, available under the trade designation "MIL SPEC B22191, Type 1, Class 2" from Georgia Packaging Inc. of Columbus, Ga., which consisted of a layer of 0.015 mm "ACLAR RX160", a layer of 0.018 mm low density polyethylene, a layer of 0.012 mm polyethylene terephthalate, and a layer of 0.064 mm low density polyethylene, was cut to about 2.8 cm by about 33 cm. The microporous membrane was placed on the lower jaw of a laboratory heat sealer (commercially available under the trade designation Sentinel Heat Sealer from Sentinel Corp. of Hyannis, Mass.). The barrier film was positioned on top of the microporous membrane such that the membrane was about 0.63 cm from the edge of the barrier film. The sealer was activated; the settings were 121.1° C.±2.8° C., 0.28 MPa, 2 seconds dwell time.

2) Preparing a pouch

The heat sealer was adjusted to a higher temperature, 221.1° C.±2.8° C., 0.28 MPa, 2 seconds dwell time. Two pieces, prepared as described in step 1, were placed together with the membrane side (depicted as layers 14 and 15 in FIG. 1) in a face to face relation. The barrier layer formed the outside of the pouch (depicted as layers 12 and 13 in FIG. 1). This was heat sealed to form a strip about 0.63 cm wide, thus forming the base of the pouch. This strip was cut into about 3.8 cm by about 3.8 cm squares. Two edges of each square were heat sealed together, leaving one edge open. The ends of this open section were heat sealed about 0.63 cm in from each edge to yield about a 2.5 cm section along the center section of one edge of each pouch which was not sealed.

3) Filling the pouch

Using the same heat settings from step 2), the pouch was filled with the desired indicating composition by using about 0.3 cm$^3$ of desired indicating mixture, care being taken to remove all air bubbles from the pouch. The top of the pouch was heat sealed, as in step 2). The device was then ready for testing (as described above) or for placement on a container by use of a pressure sensitive adhesive (commercially available under product number 467 from the 3M Company of St. Paul, Minn.).

4) Indicating Compositions

The following indicating compositions were prepared by combining the compounds in Table 1 in the weight percentages indicated. Each of the components, some of which are very hygroscopic, was stored in a sealed container with molecular sieve under an atmosphere of nitrogen. All compositions were prepared in air and then purged with nitrogen. Each of composition included 0.1 gram Euroglaucine dye from Aldrich Chemical Co. of Milwaukee, Wis. 1,4-Butanediol (99% pure, 0.35% water), 1,2-propanediol (99% pure), triethylene glycol (99% pure), and diethylene glycol (99% pure) were obtained from Aldrich Chemical Co. of Milwaukee, Wis.; isopropanol (reagent grade, 99.7% pure) was obtained from EM Science of Gibbstown, N.J.; glycerol (99.5% pure, 0.5% water) was obtained from Mallinckrodt Baker, Inc. of St. Louis, Mo.; ethylene glycol (99.991% pure, 0.009% water) and methyl ethyl ketone (99.7% pure, 0.02% water) was obtained from JT Baker Inc. of Phillipsburg, N.J. The critical temperature for each is an average of 10 trials. The error for each is less than about 1° C.

2) is a laminate of a layer of polyethylene terephthalate (PE), a layer of low density polyethylene (LDPE), a layer of aluminum foil, another layer of low density polyethylene (LDPE), and a layer of 0.064 mm linear low density polyethylene (LLDPE), which is commercially available under the trade designation "BN 48" from Georgia Packaging Inc. of Columbus, Ga. In this construction, the LLDPE side of the laminate faces the inside of the device and the PET side is on the outside.

A second barrier material (depicted as 22 in FIG. 2) is a thermoformed laminate of a layer of 0.19 mm polyvinyl chloride (PVC), a layer of 0.051 mm LDPE, a layer of 0.015 mm "ACLAR Rx160" fluoropolymer, and a layer 0.051 mm LDPE, which is commercially under the trade designation "VPA 760" from Tekni Plex Inc. of Somerville, N.J. In this construction, the LDPE side of the laminate faces the inside of the device and the PVC side is on the outside.

The microporous polypropylene membrane (depicted as 24 in FIG. 2) described in Example 1 was cut into a 1 cm diameter disc and heat sealed under the conditions described in Example 1 around the periphery to the bottom of the reservoir formed by the second barrier material. The desired indicating composition was then placed in the reservoir and the first barrier material was heat sealed to the second barrier material across the top.

Example 3

This example demonstrates the effect of a thickener on the indicating composition and the device. Three indicating compositions were prepared, each having a different thickener concentration, and the time to wet out the membrane was recorded. The indicating composition included 81% 1,4-butanediol, 14% 1,2-propanediol, and 5% isopropyl alcohol. To this was added 0.1 gram of Erioglaucine dye. This indicating composition has a critical indicating temperature of −0.4° C. To 100 grams of this dye-containing composition was added 3.75 grams, 2.5 grams, or 1.25 grams, respectively, of fumed silica, which is commercially available under the trade designation "Cab-O-Sil M15" from Cabot Corp. of Tuscosa, Ill. These mixtures were placed in individual jars, purged with nitrogen, sealed, and placed on a shaker overnight to agitate the compositions.

TABLE 1

| Critical Temperature | −4.8° C. | −3.2° C. | −2.0° C. | 3.4° C. | 1.6° C. | −0.4° C. | 2° C. | 2° C. | 4° C. | 2° C. |
|---|---|---|---|---|---|---|---|---|---|---|
| 1,4-butanediol (primary component) | 75 | 85 | 80 | 80 | 87.5 | 81 | 85 | 90 | 87 | 90 |
| 1,2-propanediol (modifying component) | 20 | | 6 | | | 14 | | | 8 | |
| isopropanol (wetting component) | | 5 | 5 | 5 | 5 | 5 | 5 | | 5 | |
| methanol (wetting component) | 5 | | | | | | | | | |
| glycerol (modifying component) | | 10 | | | | | | | | |
| triethylene glycol (modifying component) | | | | 5 | | | | | | |
| diethylene glycol (modifying component) | | | | | 7.5 | | | | | |
| ethylene glycol (modifying component) | | | | | | | 10 | 5 | | 5 |
| methyl ethyl ketone (wetting component) | | | | | | | | 5 | | 5 |

Example 2

This example illustrates the preparation of a device as depicted in FIG. 2. A barrier material (depicted as 28 in FIG.

An indicating device was prepared as described in Example 1. To each of 5 such devices for each concentration of silica, 0.3 ml of the thickened indicating composition was added. The indicating devices were placed in a constant temperature bath at −2° C. The 3.75 wt-% silica sample was activated in 1 hour; the 2.5 wt-% silica sample was activated in 45 minutes; the 1.25 wt-% silica sample was activated in 30 minutes as did a control sample that contained no silica.

Example 4

This example illustrates the lower level of wetting component and modifying component needed for activation. Indicating devices as described in Example 1 were used. Five samples of each composition were tested at −3° C. for 30 minutes. Each of the following compositions included 0.1 gram Euroglaucine dye. For a composition containing 98% 1,4-butanediol, 1% 1,2-propanediol, and 1% isopropanol, none of the samples were activated. For a composition containing 97% 1,4-butanediol, 2% 1,2-propanediol, and 1% isopropanol, two of the five samples were activated. For a composition containing 97% 1,4-butanediol, 1% 1,2-propanediol, and 2% isopropanol, five of the five samples were activated. For a composition containing 98% 1,4-butanediol, 1% propylene glycol, and 1% isopropanol, five of five the samples were activated. Thus, indicating compositions containing as little as 1% wetting component and 1% modifying component can produce effective indicating devices.

Example 5

This example illustrates that a three component system can provide indicating devices that activate at a wide variety of temperatures over a relatively broad temperature range. Indicating devices as described in Example 1 were used. Ten samples of each composition were tested. Each of the following compositions included 0.1 gram Euroglaucine dye. Samples were placed in a low temperature bath at a temperature above the critical temperature and the temperature was lowered by 1° C. increments every 30 minutes. The temperature at which each of the samples activated was recorded. For any one composition, the critical temperature recorded in Table 2, below, was an average of ten samples.

TABLE 2

| 1,4-Butanediol | 1,2-Propane Glycol | Isopropyl Alcohol | Temp. (° C.) | Standard Deviation |
|---|---|---|---|---|
| 89.0 | 6.0 | 5.0 | 4.5 | 0.5 |
| 87.0 | 8.0 | 5.0 | 4.0 | 0.0 |
| 85.0 | 10.0 | 5.0 | 3.0 | 0.0 |
| 83.0 | 12.0 | 5.0 | 2.0 | 0.3 |
| 81.0 | 14.0 | 5.0 | −0.4 | 0.5 |
| 80.0 | 15.0 | 5.0 | −1.1 | 0.3 |
| 79.0 | 16.0 | 5.0 | −1.8 | 0.4 |
| 75.0 | 20.0 | 5.0 | −4.8 | 0.4 |

Although the invention has been described with respect to specific preferred embodiments, it should be appreciated that other embodiments utilizing the concept of the present invention are possible without departing from the scope of the invention. The invention, for example, is not intended to be limited to the specific adhesive articles discloses in the preferred embodiments. The invention is not intended to be limited to the preferred embodiments described herein, but rather the invention is defined by the claims and equivalents thereof.

What is claimed is:

1. A device for indicating if an object is exposed to a critical temperature; the indicating device comprising:
   (a) a microporous membrane;
   (b) an indicating composition containing less than about 10 wt-% water; the composition comprising:
      (i) a major amount of a primary organic component comprising at least one compound that has a freezing point above the critical temperature and does not spontaneously wet out the microporous membrane at a temperature at least about 30° C. above the critical temperature;
      (ii) a modifying component comprising at least one compound that has a freezing point below the critical temperature and modifies the temperature at which the primary organic component solidifies; and
      (iii) a wetting component comprising at least one compound that has a freezing point below the critical temperature and is capable of spontaneously wetting out the microporous membrane at about the critical temperature; and
   (c) means for containing the microporous membrane and the indicating composition;
wherein the primary organic component, modifying component, and wetting component are miscible liquids above the critical temperature, and are present in a ratio such that the composition does not spontaneously wet out the microporous membrane at a temperature at least about 30° C. above the critical temperature, but does wet it out at about the critical temperature upon solidification of a portion of the composition.

2. The indicating device of claim 1 wherein the containing means comprises a barrier material that retards the transmission of water vapor into the indicating composition.

3. The indicating device of claim 1 which has a response time of no greater than about 60 minutes.

4. The indicating device of claim 3 which has a response time of no greater than about 30 minutes.

5. The indicating device of claim 1 which is capable of being activated within about ±2° C. of the critical temperature of the object being monitored.

6. The indicating device of claim 1 wherein the primary organic component is a mixture of two organic compounds.

7. The indicating device of claim 1 wherein the primary organic component, modifying component, and wetting component are present in a ratio such that the composition does not spontaneously wet out the microporous membrane at a temperature at least about 45° C. above the critical temperature.

8. The indicating device of claim 7 wherein the microporous membrane comprises a material selected from the group consisting of polyolefin, polysulfone, polytetrafluoroethylene, polyamide, polyester, cellulose derivatives, and combinations thereof.

9. The indicating device of claim 8 wherein the microporous membrane comprises a polyolefin.

10. The indicating device of claim 1 wherein the modifying component comprises water in an amount of less than about 1 wt-% based on the total weight of the indicating composition.

11. The indicating device of claim 1 wherein the indicating composition further includes a colorant.

12. The indicating device of claim 1 wherein the primary organic component comprises a polyfunctional alcohol.

13. The indicating device of claim 12 wherein the modifying component comprises a polyfunctional alcohol.

14. The indicating device of claim 12 wherein the wetting component comprises a ($C_1$–$C_8$)alcohol.

15. The indicating device of claim 1 wherein the wetting component has a viscosity of less than about 50 Centipoise at 23° C.

16. The indicating device of claim 1 wherein the wetting component comprises a compound selected from the group consisting of propylene glycol having a weight average molecular of less than about 2000, ($C_1$–$C_8$)alcohol, ($C_2$–$C_8$) ketone, ($C_2$–$C_8$)ether, ($C_5$–$C_{18}$)alkane, halogenated ($C_5$–$C_{18}$)alkane, ($C_5$–$C_{18}$)alkene, halogenated ($C_5$–$C_{18}$) alkene, ($C_1$–$C_8$)amine, and combinations thereof.

17. A device for indicating if an object is exposed to a critical temperature; the indicating device comprising:
 (a) a microporous membrane;
 (b) an indicating composition containing less than about 1 wt-% water; the composition comprising:
  (i) at least about 50 wt-% of a primary organic component comprising at least one compound that has a freezing point above the critical temperature and does not spontaneously wet out the microporous membrane at a temperature at least about 30° C. above the critical temperature;
  (ii) no greater than about 40 wt-% of a modifying component comprising at least one compound that has a freezing point below the critical temperature and modifies the temperature at which the primary organic component solidifies; and
  (iii) no greater than about 20 wt-% of a wetting component comprising at least one compound that has a freezing point below the critical temperature and is capable of spontaneously wetting out the microporous membrane at about the critical temperature; and
 (c) means for containing the microporous membrane and the indicating composition;
wherein the primary organic component, modifying component, and wetting component are miscible liquids above the critical temperature, and are present in a ratio such that the composition does not spontaneously wet out the microporous membrane at a temperature at least about 30° C. above the critical temperature, but does spontaneously wet it out at about the critical temperature upon solidification of a portion of the composition.

18. The indicating device of claim 17 which has a response time of no greater than about 30 minutes.

19. The indicating device of claim 18 which is capable of being activated within about ±1° C. of the critical temperature of the object being monitored.

20. The indicating device of claim 17 wherein the means for containing the microporous membrane and indicating composition comprises a barrier material selected from the group consisting of a fluoropolymer, polyolefin, polyester, halogenated polyolefin, metallized polyester, metallic foil, and combinations thereof.

21. The indicating device of claim 17 wherein the means for containing the microporous membrane and indicating composition comprises a thermoformable barrier material.

22. The indicating device of claim 17 wherein the indicating composition is contained in a reservoir formed by a nonporous washer.

23. The indicating device of claim 17 wherein the primary organic component comprises a polyfunctional alcohol.

24. The indicating device of claim 23 wherein the primary organic component comprises a compound selected from the group consisting of 1,3-butanediol, 1,4-butanediol, 2,3-butanediol, 1,3-propanediol, and triethanol amine, ethylene glycol, di(ethylene glycol), glycerol, tripropylene glycol, polyethoxylated derivatives of these glycols, polyethylene glycol, block copolymers of ethylene glycol and propylene glycol, and combinations thereof.

25. The indicating device of claim 23 wherein the modifying component comprises a polyfunctional alcohol.

26. The indicating device of claim 25 wherein the modifying component comprises a compound selected from the group consisting of 1,3-propanediol, ethylene glycol, di(ethylene glycol), triethylene glycol, propylene glycol, glycerol, tripropylene glycol, polyethoxylated derivatives of these glycols, polyethylene glycol, and combinations thereof.

27. The indicating device of claim 17 wherein the wetting component comprises a compound selected from the group consisting of ($C_1$–$C_8$)alcohol, ($C_2$–$C_8$)ketone, ($C_2$–$C_8$)ether, ($C_5$–$C_{18}$)alkane, halogenated ($C_5$–$C_{18}$)alkane, ($C_5$–$C_{18}$) alkene, halogenated ($C_5$–$C_{18}$)alkene, ($C_1$–$C_8$)amine, and combinations thereof.

28. The indicating device of claim 17 wherein the indicating composition further includes an immobilizing agent.

29. A device for indicating if an object is exposed to a critical temperature; the indicating device comprising:
 (a) a microporous membrane comprising a polyolefin;
 (b) an indicating composition containing less than about 1 wt-% water; the composition comprising:
  (i) at least about 50 wt-% of a primary organic component comprising at least one polyfunctional alcohol that has a freezing point above the critical temperature and does not spontaneously wet out the microporous membrane at a temperature at least about 30° C. above the critical temperature;
  (ii) no greater than about 40 wt-% of a modifying component comprising at least one polyfunctional alcohol that has a freezing point below the critical temperature and modifies the temperature at which the primary organic component solidifies; and
  (iii) no greater than about 20 wt-% of a wetting component comprising at least one compound selected from the group consisting of alcohols, ketones, ethers, alkanes, alkenes, amines, and combinations thereof; wherein the compound has a freezing point below the critical temperature and is capable of spontaneously wetting out the microporous membrane at about the critical temperature; and
 (c) means for containing the microporous membrane and the indicating composition and retarding the transmission of water vapor into the indicating composition;
wherein the primary organic component, modifying component, and wetting component are miscible liquids above the critical temperature, and are present in a ratio such that the composition does not spontaneously wet out the microporous membrane at a temperature at least about 30° C. above the critical temperature, but does spontaneously wet it out at about the critical temperature upon solidification of a portion of the composition.

30. The indicating device of claim 29 which has a response time of no greater than about 60 minutes and is capable of being activated within about ±2° C. of the critical temperature of the object being monitored.

* * * * *

UNITED STATES PATENT AND TRADEMARK OFFICE
CERTIFICATE OF CORRECTION

PATENT NO.   : 5,964,181
DATED        : October 12, 1999
INVENTOR(S)  : Rodger J. Pereyra, Russell D. Birkholz and Matthew T. Scholz It is certified that error appears in the above-identified patent and that said Letters Patent is hereby corrected as shown below:

Column 10,
Line 31, "ACLARRXI60" should read -- "ACLAR RX160" --

Column 14,
Line 48, "$(C_5-C_8)$" should read -- "$(C_5-C_{18})$" --

Signed and Sealed this

Fifth Day of March, 2002

Attest:

JAMES E. ROGAN
Attesting Officer    Director of the United States Patent and Trademark Office